Dec. 6, 1949  J. M. TYLER ET AL  2,490,492
ENGINE SUSPENSION
Filed Jan. 1, 1945  3 Sheets-Sheet 1
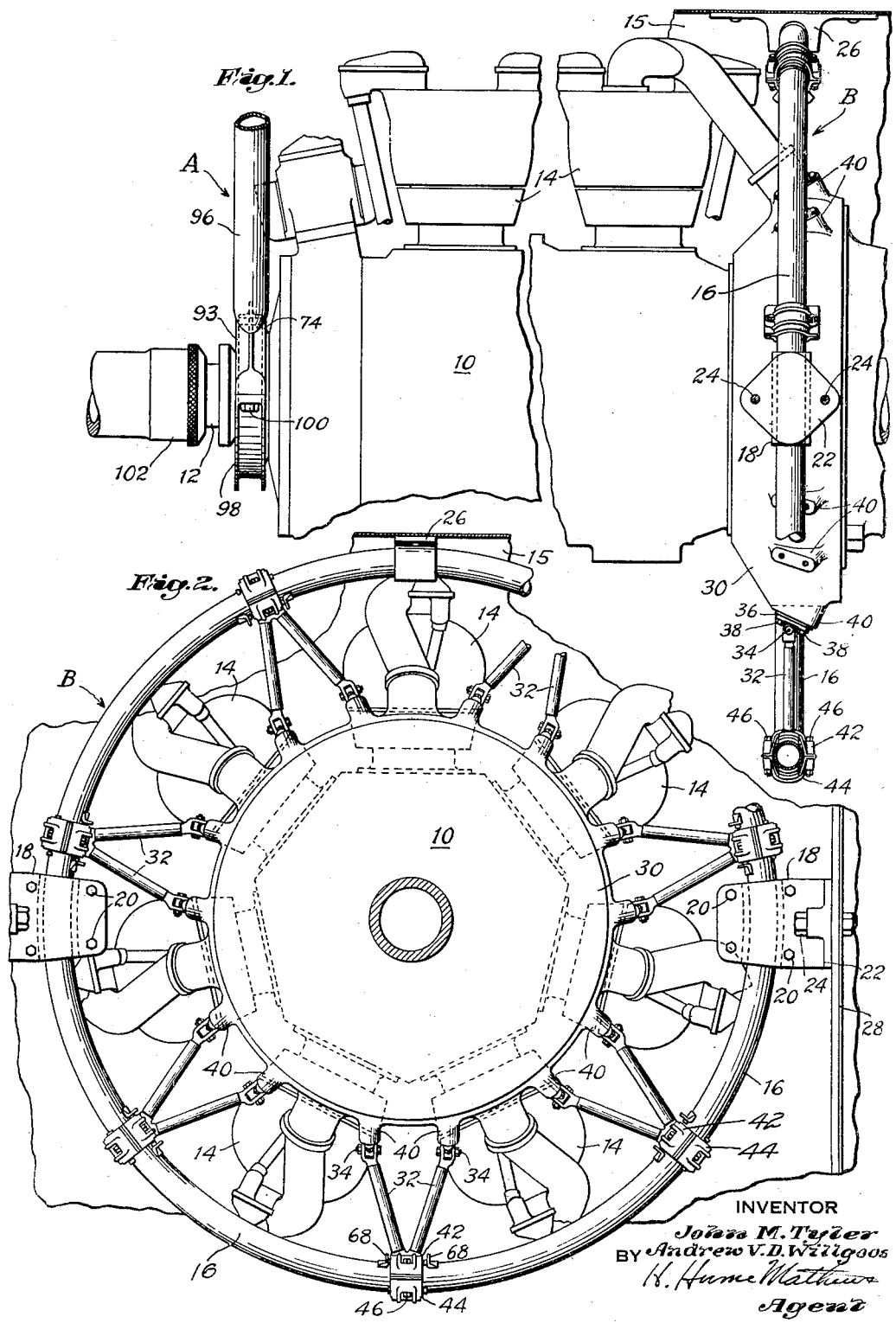
INVENTOR
John M. Tyler
BY Andrew V. D. Willgoos
H. Hume Mathews
Agent

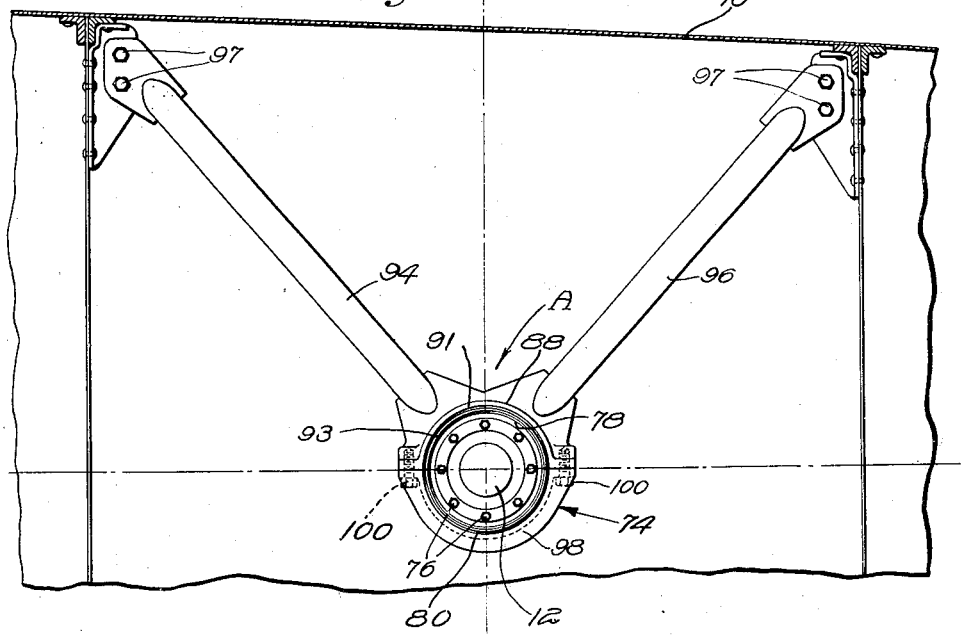
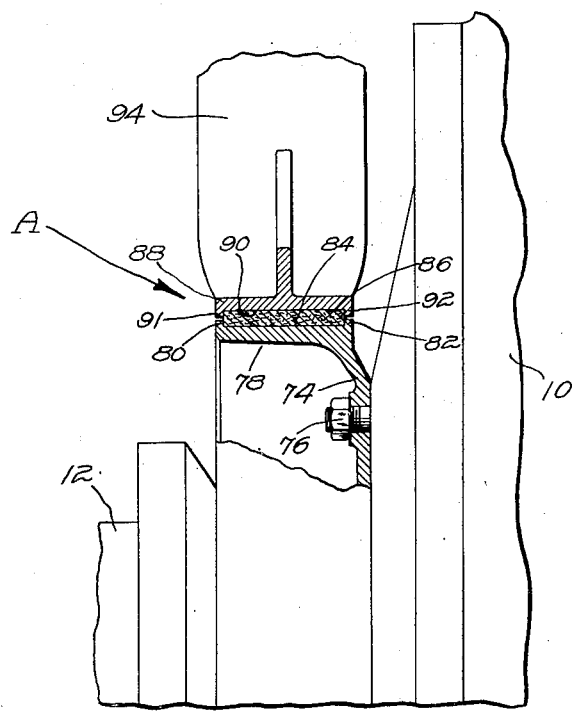

Dec. 6, 1949     J. M. TYLER ET AL     2,490,492
ENGINE SUSPENSION
Filed Jan. 1, 1945     3 Sheets-Sheet 3
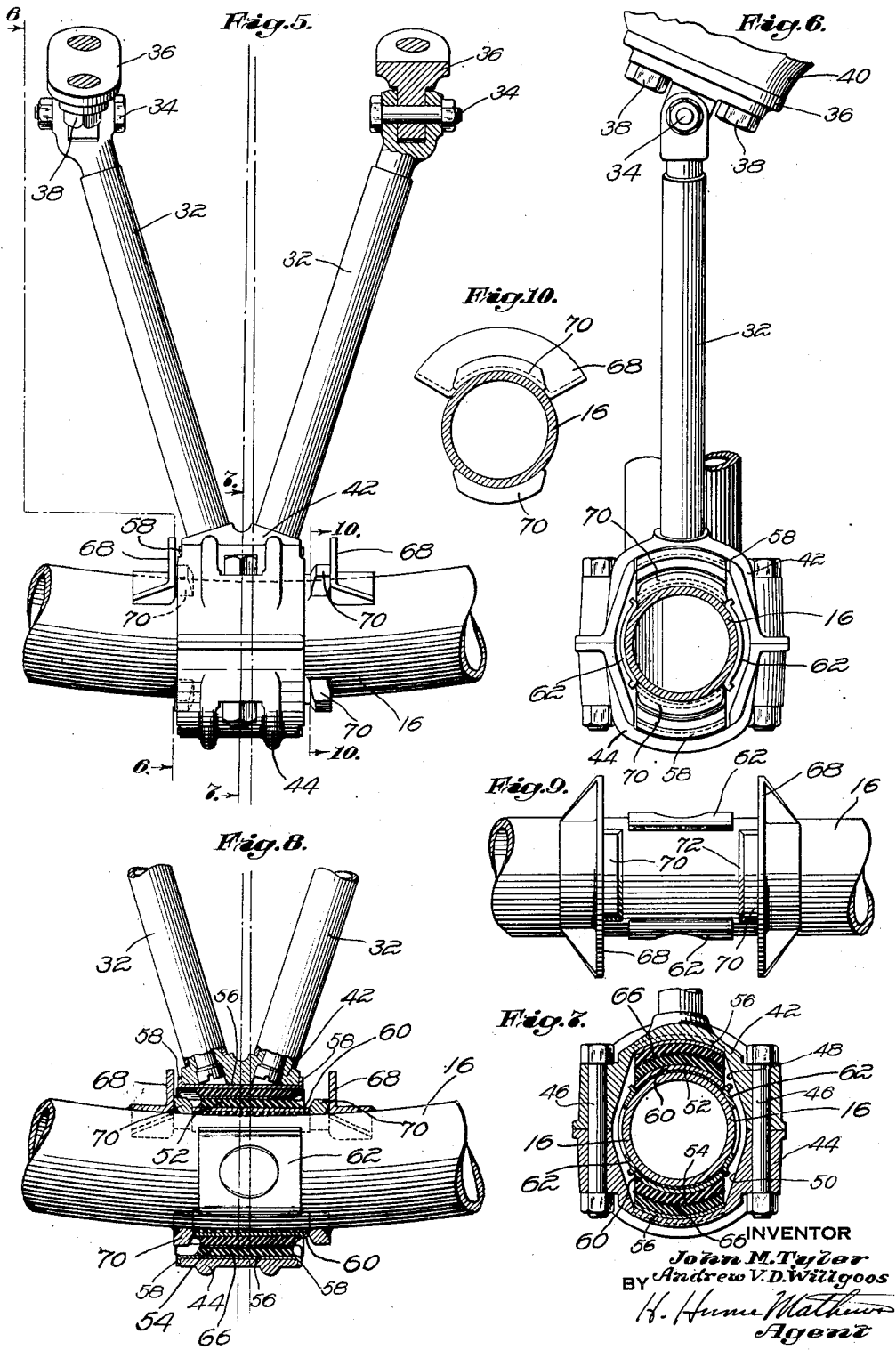
INVENTOR
John M. Tyler
BY Andrew V. D. Willgoos
H. Hume Mathews
Agent Patented Dec. 6, 1949

2,490,492

UNITED STATES PATENT OFFICE 2,490,492

ENGINE SUSPENSION

John M. Tyler and Andrew V. D. Willgoos, West Hartford, Conn., assignors to United Aircraft Corporation, East Hartford, Conn., a corporation of Delaware Application January 1, 1945, Serial No. 570,840

11 Claims. (Cl. 248—5)

1

This invention relates to improvements in the suspension of aircraft engines.

An object of the invention is to provide improved suspension means for aircraft engines by which an engine is supported in two planes transverse to the longitudinal axis of the engine and at widely spaced locations along said axis.

A further object of the invention is to provide a two-plane engine suspension system of the above type for use on engines having an extension shaft drive to a propeller separately mounted on the aircraft structure.

A still further object of the invention is to provide a two-plane engine suspension system in which an engine is supported, in effect, on two bearings at spaced locations along its axis of rotation, one of which is located adjacent the drive end of the engine and has no radial flexibility and no stiffness resisting torsionally applied loads and the other of which is located toward the other end of the engine and includes flexible attachments to the aircraft frame structure which are flexible in the direction of radially and torsionally applied loads.

Another and related object of the invention is to provide a two-plane engine suspension system in which the mount in the plane adjacent the drive end of the engine resiliently resists fore and aft movements of the engine and provides controlled frictional damping of torsional vibrations of the engine.

A further object of the invention is generally to improve the construction and performance of engine mounts.

Other objects and advantages of the invention will be apparent from the following description and from the accompanying drawings which illustrate one embodiment of the invention.

In the drawings,

Fig. 1 is a side view of one form of two-plane engine suspension constructed in accordance with the invention;

Fig. 2 is a view from the right hand end of Fig. 1 showing the arrangement of the engine supporting frames of one of the mounts;

Fig. 3 is a view of the other mount from the left hand end of Fig. 1;

Fig. 4 is an elevation, partly in section, of the mount of Fig. 3 on a much enlarged scale;

Fig. 5 is an enlarged detail of one of the frames shown in Fig. 2;

Fig. 6 is a section on line 6—6 of Fig. 5;

Fig. 7 is a section on line 7—7 of Fig. 5;

Fig. 8 is a section through the flexible attachment and certain of the ring carried parts which

2 cooperate therewith taken in the plane of the ring;

Fig. 9 is a detail of a portion of the ring as viewed from the center thereof; and Fig. 10 is a section on line 10—10 of Fig. 5.

As shown herein, a radial aircooled engine 10 (which may be the engine shown and described in detail in the Hobbs-Willgoos Patent No. 2,426,879, assigned to applicant's assignee) having a longitudinal crankshaft 12 and radially disposed cylinders 14 is supported in a submerged position in a wing 15 of an aircraft by engine mounts A and B located in planes transverse to the longitudinal axis of the engine and at spaced locations along said axis. While the engine illustrated is of the radial type and is shown submerged in a wing of the aircraft, it will be evident that the invention is equally applicable to the suspension of other types of engines and to the support of these engines on other structural members of the aircraft.

Referring first to mount B shown in Figs. 1 and 2 and in detail in Figs. 5 to 10, inclusive, it will be noted that a mounting ring 16 of annular cross-section is supported on the aircraft structure at diametrically opposite points on its periphery by brackets 18 (Fig. 2). Each of these brackets comprises two plates having complemental arcuate grooves formed in confronting faces thereof to receive peripheral portions of the ring 16 to the opposite sides of which they are rigidly clamped by four through bolts 20. One of the plates of each bracket is formed with a flange 22 which is detachably secured by two bolts 24 to wing ribs, one of which is shown at 28. The ring 16 is further supported at the top thereof by a bracket 26 provided with a vertical ring receiving slot which permits movement of the ring relative to the bracket in a vertical direction. It will be evident from Figs. 1 and 2 that the ring 16 is supported in the vicinity of the blower casing 30 with its center coincident with the axis of crankshaft 12 of the engine, and further that the plane of the ring 16 is disposed perpendicular to the engine crankshaft axis.

The engine is connected to the ring 16 by a plurality of A-frames which are spaced peripherally about the engine and ring and comprise rigid inwardly divergent legs, or struts, 32 which lie in the plane of the ring. Each of the struts 32 has an offset, radially directed inner end portion which is bifurcated and which is connected by a bolt 34 to the tongue of a bracket 36 secured by cap screws 38 to pairs of peripherally spaced pads 40 on the engine blower casing (see Figs. 2 and 6). At its outer end each pair of the struts 32 is rigidly connected to one part 42 of a two-part head the other part 44 of which comprises a cap secured to the part 42 by a pair of through bolts 46. The parts 42 and 44 have complemental recesses 48 and 50 therein forming a chamber which encloses a portion of the cross-sectional periphery of the ring, the chamber providing sufficient space in the plane of the ring to receive resilient mount elements 52 and 54 on opposite sides of the peripheral portion of the ring enclosed by the head. It will be understood that these elements are compressed between the head parts 42 and 44 and the ring 16 as the bolts 46 are tightened so that the rubber of elements 52 and 54 is under some initial compression. Each resilient element is provided with an arcuate metal shell 56 having flanges 58 which overlie the sides of the head parts 42 and 44 and position the elements against displacement relative thereto in the direction of the periphery of the ring, while the element is positioned by the side-walls of the recesses 48 and 50 against movement in a direction at right angles thereto. The elements 52 and 54 are positioned against movement about the cross-sectional periphery of the ring by arcuate shells 60 which abut the edges of spaced plates 62 welded to diametrically opposite faces of the cross-sectional periphery of the ring. The elements 52 and 54 may also be provided with metal inserts 66 in a well known manner to vary the stiffness thereof, the rubber of these elements being permanently bonded to the shells 56 and 60 and to the inserts 66 in the usual manner.

Suitable stops 68 are provided on the inside of the ring 16 at opposite sides of the heads to prevent excessive torque windup. It will be noted that in the no-torque position of the parts, as shown in Fig. 8, the head is located adjacent the left hand stop 68 so that when the engine is developing normal torque the head will be located substantially midway between the stops. Arcuate strips 70 are welded to the inside and outside of the ring in position to center the inner shells 60 of the resilient elements, these strips having adjacent inclined surfaces 72 which act to guide any shell 60 into its normal position on the ring if it becomes separated therefrom due to extreme compression of the opposite element resulting from high maneuver load conditions.

The mount A, shown most clearly in Figs. 3 and 4 is located at the propeller end of the engine and includes a bracket 74 secured to the engine crankcase by studs 76. The bracket 74 has a forwardly extending annular flange 78 the outer surface of which is provided with radially outstanding flanges 80 and 82 providing a flat annular groove 84 for receiving a band 86 of yieldable but relatively stiff friction material such as the material conventionally used in brake linings. The band may conveniently be formed of two semi-circular sections which are held in place in the groove by a hanger 88 which has a like confronting groove 90 formed therein by flanges 91 and 92 similar to the flanges 80 and 82. The hanger also is made in two parts, the upper supporting part 93 being connected by means of upwardly diverging struts 94 and 96 and bolts 97 with the structural frame of the aircraft, and the lower part 98 being removably detached to part 93 by cap screws 100. It will be noted that the thickness of band 86 is such that the confronting flanges 91, 80 and 92, 82 are spaced apart by the band which forms an annular key to interlock the hanger and bracket members 88 and 74 in a fore and aft direction while also supporting the engine at this point with a minimum of radial flexibility. This construction holds the engine against lateral movement at mount A which is desirable because the crankshaft 12 is connected at this location with a spline drive 102 with which it is essential that the engine be maintained in accurate alignment.

It will thus be evident that, since the mount A constitutes a bearing for supporting the engine at the drive end thereof, engine torque is carried entirely by the flexible mount B at the end of the engine remote from the drive end through shear of the rubber segments of the elements 52 and 54. Radial "g" loads, i. e. loads imposed on the mounts by the engine due to maneuvers, are also carried at this end of the engine through compression of the segments of the elements 52 and 54 along their major compressive axes. Hence, the radial stiffness of the mount B is relatively high so that the engine is in effect, journalled at this end as well as at the drive end, although some resiliency is provided at mount B. It will also be evident that, with the legs 32 of the A-frames disposed in a plane perpendicular to the crankshaft axis and with the pivots 34 connecting these legs to the brackets 36 also lying in this plane, bending loads at the attachment of the brackets 36 to the blower housing 30 due to fore and aft movements of the engine are practically eliminated.

Fore and aft "g" loads from the engine are taken through the damper band 86 as shear loading. This band also acts to suppress torsional vibration of the engine by imposing frictional resistance to rotation of the engine attached bracket 74 with respect to the hanger 88. If desired, a few thousandths of an inch clearance may be provided between the damper band 86 and the adjacent surfaces 84 and 90 so that when the engine is at rest contact between the band and surfaces 84 and 90 will occur only at the bottom. Then when torque is applied to the engine and it rotates, in effect, in its two bearings provided by mounts A and B, the annular surface 84 will roll on the band 86 so that the point of contact between the band and surfaces 84 and 90 will move up along one side of the circumference of these surfaces. When the vertical component of load at the point of contact becomes large enough, sliding will take place and the point of contact will move downward towards the bottom again. Thus by providing suitable clearance a small amount of torsional vibration may exist without friction at mount A, but as soon as the torsional deflection exceeds the value determined by the clearance at this point friction damping will be introduced.

As a result of these improvements it will be evident that an improved two-plane engine mount has been provided in which the engine is, in effect, mounted in two axially spaced bearings one of which has no radial flexibility and the other of which is designed to absorb radial vibrations of the engine. It will also be evident that a two-plane mount has been provided in which the mount in one of these planes absorbs the torsional vibrations of the engine in shear of the resilient elements thereof, while the other mount provides frictional damping of such torsional vibrations. It will further be evident that fore and aft deflections of the engine due, for example, to "g" loads are absorbed in shear of the damping band at the propeller end of the engine, while the mount B, due to torsional movements of the flexible attachments about the cross-sectional periphery of the ring, which place the resilient elements thereof in shear, resiliently restrains such fore and aft movements.

While one desirable embodiment of the invention has been described herein and illustrated in the drawings, it is to be understood that the invention is not limited to the details of construction or to the combination and arrangement of elements herein disclosed, but that the invention covers all such variations as come within the scope of the following claims.

We claim:

1. In an aircraft, a frame structure, an engine having a main power shaft, and means for supporting said engine on said frame structure comprising two mounts at spaced locations along said shaft, one of said mounts including flexible and pivotal connections between said engine and frame structure for yieldingly resisting radial and torsional movements of the engine and for providing relatively free or substantially unresisted fore and aft movements of the engine, and the other mount comprising a bearing type support for resisting said fore and aft movements of said engine.

2. In an aircraft, a frame structure, an engine having a crankshaft, and means for supporting said engine on said frame structure comprising two mounts at spaced locations along said crankshaft, one of said mounts including a mount ring encircling said engine and disposed in a plane perpendicular to the axis of said crankshaft, and means in the plane of said ring for connecting said engine and ring including flexible connections to said ring yieldingly resisting radial and torsional loads from said engine and a pivotal connection to said engine, and the other of said mounts comprising confronting annular grooved surfaces carried by said engine and frame structure, and a band of friction material filling said grooves for resisting fore and aft movements of said engine in shear of said material and damping torsional movements of said engine by the friction between said surfaces and said band.

3. In an aircraft, a frame structure, an engine having a crankshaft, and means for supporting said engine on said frame structure at spaced locations along said crankshaft including a mount ring fixed to said frame structure at one of said locations having its center substantially coincident with the axis of said crankshaft, rigid struts connecting said engine and ring at spaced points about their peripheries for resiliently resisting torsional and radial loads from said engine while permitting fore and aft movements of said engine, said struts comprising A-frames disposed in the planes of said ring and each having its apex flexibly connected to said ring and having its spaced extremities pivotally connected to said engine, and a mount at said other location having means for resisting fore and aft loads and radial loads from said engine while permitting movements due to torsional loads from said engine.

4. In an aircraft, a frame structure, an engine having a crankshaft, and means for supporting said engine at two spaced points along said crankshaft including a mount ring located in a plane transverse to the axis of said crankshaft and secured to said frame structure and having its center substantially coincident with said crankshaft axis, struts connecting said engine and ring at peripherally spaced points about said engine having their inner ends pivotally connected to said engine and having their outer ends resiliently connected to said ring, said struts being disposed in the plane of said ring, said resilient connections comprising heads on the ends of said struts which surround the cross-sectional periphery of said ring, and resilient members within said heads bearing against diametrically opposite portions of the cross-sectional periphery of said ring and disposed in the planes of said ring, and a bearing type support for said engine spaced from said ring along said axis including cooperating annular hangar and bracket members carried by said frame structure and engine respectively for permitting relative rotational movement of said engine about said axis, and damping means disposed between annular surfaces of said members for limiting such rotational movement.

5. In an aircraft, an engine supporting frame structure, a radial engine having a crankshaft, and means for supporting said engine at spaced points along said crankshaft including a mount ring disposed in a plane perpendicular to the axis of said crankshaft and having its center substantially coincident with the axis of said crankshaft, a plurality of pads at peripherally spaced points about said engine, pairs of struts pivotally connected at their inner end to adjacent pads and converging toward said ring, said struts being disposed in the plane of said ring and each having at its outer ends a housing surrounding the cross-sectional periphery of said ring, and resilient segmental elements within said housing bearing against the latter and also against diametrically opposite portions on the cross-sectional periphery of said ring, and a support for said engine spaced from said ring including cooperating annular supporting surfaces carried by said structure and engine respectively, and a band interlocking said annular surfaces against axial movement relative to each other and frictionally restraining relative movements of said surfaces due to torsional loads from said engine.

6. In an aircraft having an engine supporting frame structure, the combination of an engine having a crankshaft comprising the axis of rotation of the engine, and means for supporting said engine at spaced points along said axis including a mount ring carried by the aircraft structure adjacent one end of the engine and having its center substantially coincident with said engine axis, rigid struts connecting said engine and ring having like ends connected to said engine and ring respectively, said struts being substantially perpendicular to said crankshaft axis and each having a pivotal connection at one end to said engine and a flexible connection at its other end to said ring, the axes of said pivotal connections being disposed in the plane of said ring, and a bearing type support for said engine at its other end permitting rotational movement of said engine about its axis and including cooperating annular hangar and bracket surfaces on said aircraft structure and engine respectively, and a frictional band between said surfaces for controlling relative movement between said surfaces.

7. In an aircraft having an engine supporting frame structure, the combination of an engine having a crankshaft comprising the axis of rotation of the engine, and means for supporting said engine at spaced points along said axis including a mount ring carried by the aircraft structure adjacent one end of the engine and having its center substantially coincident with said crankshaft axis, a plurality of struts connecting said engine and ring at peripherally spaced points about said engine, said struts being disposed in the plane of said ring and having their inner ends pivotally connected to said engine by pivots having their axes disposed in the plane of said ring for permitting free fore and aft movements of the engine and having flexible connections at their outer ends to said ring, each of said flexible connections including a head which surrounds the cross-sectional periphery of said ring and encloses rubber mounting elements disposed on diametrically opposite surfaces of the cross-sectional periphery of said ring and in the plane of said ring, whereby rotational movement of said engine about its axis places said mounting elements in shear and radial movements of said engine places said mounting elements in compression, and a bearing type support for said engine adjacent its other end including confronting annular surfaces on said airplane structure and engine, and a band of frictional material between said surfaces for controlling relative rotational movement therebetween.

8. In an aircraft having an engine supporting frame structure, the combination of an engine having a crankshaft comprising the axis of rotation of the engine, and means for supporting said engine at two spaced points along said axis including a mount ring through which said engine projects and the center of which is substantially coincident with said engine axis, a plurality of pads at peripherally spaced points on said engine located in the plane of said ring, a plurality of pairs of diverging struts, each pair having its spaced ends pivotally connected to pads on said engine by pivots having their axes disposed in the plane of said ring and having at its other end mount heads enclosing portions of the cross-sectional periphery of said ring, resilient segments disposed in the planes of said ring and within said heads and bearing against diametrically opposite surfaces of the cross-sectional periphery of said ring, means for preventing movement of said segments about said cross-sectional periphery as the result of fore and aft movements of the engine, and a bearing type support for said engine at a point spaced along its axis from said ring including confronting annular grooved surfaces on said airplane structure and engine, and a band of resilient material of less resilience than said segments occupying the grooves between said surfaces and interlocking the same against fore and aft movements of the engine.

9. In a mounting system for a radial aircraft engine having a crankshaft, a mount ring disposed in a plane substantially normal to said crankshaft, a plurality of flexible mount brackets respectively connected to circumferentially spaced portions of said ring, and a plurality of strut members lying substantially in the plane of said ring pivotally connecting said engine and said brackets.

10. A system according to claim 9, in which said struts are pivotally connected to said engine about respective axes lying in the plane of said ring.

11. A mount for an aircraft engine having a main power shaft, comprising, a circumferential row of resilient mount units disposed in a plane substantially normal to said shaft, means providing a torsionally and radially rigid and longitudinally non-rigid connection between said engine and said mount units whereby when the mount units are secured to a frame structure angular movements of said engine about the axis of said shaft and translational movements of said engine normal to the axis of said shaft are resiliently resisted by said mount units while longitudinal movements of said engine in the direction of said axis are substantially unresisted by said mount units, and a second supporting means spaced from said mount units and said connection for resisting longitudinal movements of said engine.

JOHN M. TYLER.
ANDREW V. D. WILLGOOS.

REFERENCES CITED

The following references are of record in the file of this patent:

UNITED STATES PATENTS

| Number | Name | Date |
| --- | --- | --- |
| Re. 22,403 | Trott | Dec. 7, 1943 |
| 1,834,907 | Trott | Dec. 1, 1931 |
| 1,862,484 | Lord et al. | June 7, 1932 |
| 2,121,429 | Gluhareff | June 21, 1938 |
| 2,342,577 | Gehman | Feb. 22, 1944 |
| 2,411,562 | Thompson | Nov. 26, 1946 |

FOREIGN PATENTS

| Number | Country | Date |
| --- | --- | --- |
| 493,328 | Great Britain | May 24, 1937 |
| 498,224 | Great Britain | Jan. 2, 1939 |